June 10, 1958 N. E. LINDENBLAD 2,837,899

THERMOELECTRIC REFRIGERATOR

Filed Oct. 13, 1954 4 Sheets-Sheet 1

INVENTOR.
NILS E. LINDENBLAD
BY Morris L. Rabkin
ATTORNEY

June 10, 1958 N. E. LINDENBLAD 2,837,899

THERMOELECTRIC REFRIGERATOR

Filed Oct. 13, 1954 4 Sheets-Sheet 2

INVENTOR.
NILS E. LINDENBLAD
BY Morris L. Rabkin
ATTORNEY

June 10, 1958 N. E. LINDENBLAD 2,837,899

THERMOELECTRIC REFRIGERATOR

Filed Oct. 13, 1954 4 Sheets-Sheet 3

INVENTOR.
NILS E. LINDENBLAD
BY Morris A. Rabkin
ATTORNEY

INVENTOR.
NILS E. LINDENBLAD
BY Morris A. Rabin
ATTORNEY

United States Patent Office 2,837,899
Patented June 10, 1958

2,837,899

THERMOELECTRIC REFRIGERATOR

Nils E. Lindenblad, Princeton, N. J., assignor to Radio Corporation of America, a corporation of Delaware Application October 13, 1954, Serial No. 462,078

6 Claims. (Cl. 62—1)

This invention relates to refrigerating apparatus, and more particularly to apparatus for refrigerating by means of the Peltier effect.

Refrigerating devices may be conveniently used in inhabited rooms or compartments. They may be used, for example, in air conditioning units and refrigerators. These devices should be quiet and free of vibration. There should also be no danger from escaping gas. A refrigerating device employing a thermoelectric heat pump is well adapted for use in inhabited rooms.

When a direct current is passed through a circuit coupling two materials having dissimilar thermoelectric properties, one junction between the materials absorbs heat and the other junction rejects heat. The heat rejected is equal to the sum of the heat absorbed and the current resistance heat. This phenomenon has been investigated in various laboratories. Very little or no practical use, however, has been made of this phenomenon which is known as the Peltier effect. This invention provides a refrigerating unit that operates by application of the Peltier effect.

An object of this invention is to provide a refrigerator which utilizes a thermoelectric cooling device.

Another object is to provide a refrigerator which has no mechanical moving parts.

A further object is to provide a device for cooling and freezing stored objects by means of the Peltier effect.

A still further object is to provide a compact device having the aforementioned characteristics.

In accordance with this invention a thermoelectric refrigerator may be constructed which includes no mechanical moving parts. An array of thermocouples provides cold junctions for cumulatively cooling a circulating heat transfer fluid. The heat rejected at the hot junctions is carried away by a flow of cooling fluid, for example, tap water, flowing in heat exchange relationship with the hot junctions.

The cooled circulating fluid is channeled through a cooling compartment where it absorbs heat from materials stored therein. The compartment is maintained at a temperature above freezing to provide proper storage conditions for food substances such as butter, milk or other beverages. The circulating fluid, after absorbing a quantity of heat in the cooling compartment, is circulated in heat exchange relationship with the hot junctions of another array of segregated thermocouples. This permits the cold junctions of the segregated array to absorb heat at a temperature below the freezing point of water. These cold junctions may form a heat absorbing enclosure. This enclosure provides a freezing compartment for manufacture of ice or for storage of frozen food.

The use of a mechanical pump for circulating the heat transfer fluid may be avoided by counterflowing fluid discharged from the system in heat exchange relationship with fluid entering the system from an external source of fluid under pressure, for example, a tap water supply. With sufficient heat transfer area between outlet and inlet fluid, the temperatures of discharge fluid and incoming fluid are equalized. This prevents heat from being carried directly into the system by the incoming circulating fluid if it is warmer than the outgoing fluid.

A refrigerating unit using tap water for a circulating fluid as well as for cooling hot junctions need include no mechanical moving parts. It is, therefore, quiet and free of vibration. In one form of this invention, however, a small pump for propelling the circulating fluid may optionally be provided.

Other objects and advantages of the present invention will become apparent to one skilled in the art from a reading of the following description in conjunction with the accompanying drawings in which.

Figure 1:
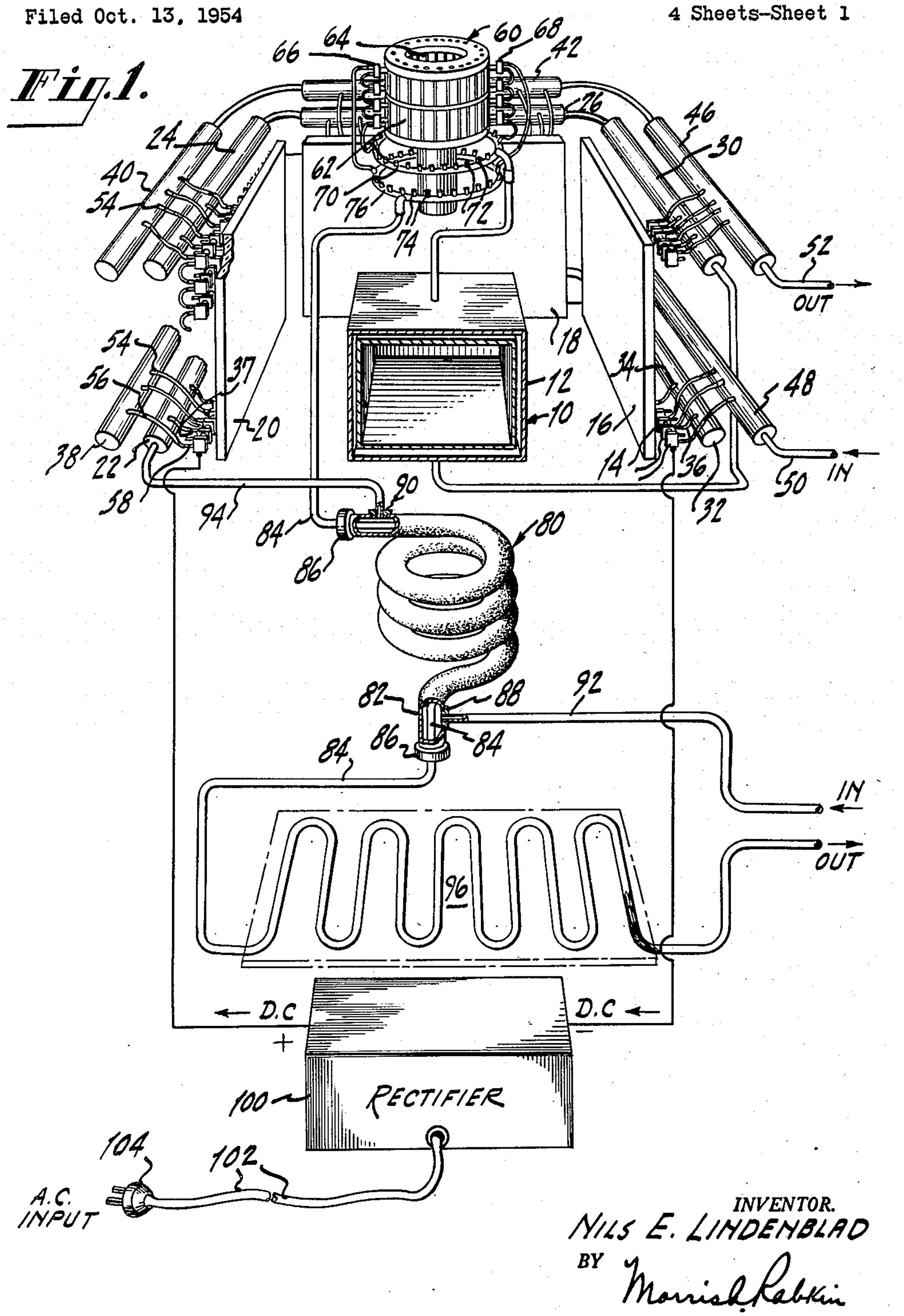
Fig. 1 is an exploded perspective view of portions of an illustrative embodiment of the invention.

In Fig. 1 portions of an illustrative refrigerator operating in accordance with the Peltier effect are shown in an exploded view to illustrate their physical appearance and spatial relationship. A hollow walled cooling compartment 10 is provided. Food substances such as butter, milk or other beverages are stored in this compartment at temperatures above freezing. These food substances are cooled by heat exchange with a heat transfer fluid circulating within the hollow walls 12 of the compartment. This heat transfer fluid is cooled by an array of thermocouples 14 mounted on panels 16, 18 and 20 which surround the cooling compartment on three sides. The third side is left unobstructed to provide access to the compartment. A suitable door may be provided for sealing the compartment.

The heat transfer fluid is circulated in heat exchange relationship with the cold junctions of thermocouples 14 which are mounted in a grid-lake array on the outside surfaces of the panels. The thermocouples are mounted on the external surfaces of the panels to provide access for connection and for ease of maintenance. Manifolds 22, 24, 26, 30, and 32, and another manifold (not shown) spaced behind the rear panel 18 and below the manifold 26 thereon, provide means for circulating a heat transfer fluid in heat exchange relationship with the cold junctions of the thermocouples 14 mounted on these panels. Tubes 34 project a short distance from these manifolds to provide means for connecting flexible tubes 36 to tubes 37 projecting from portions of the thermocouples 14. These tubes may, for example, be made of an insulating material such as rubber to prevent absorption of heat from the surrounding atmosphere. The outside surfaces of the manifolds may be insulated for this same purpose. The structure of the thermocouples and their method of mounting on the panels is later described in detail. The circulating system and electrical system are also described in detail by means of a schematic diagram.

Another conduit system for circulating a cooling fluid, for example, tap water, in heat exchange relationship with the hot junctions of thermocouples 14 is also provided. Manifolds 38, 40, 42, 46 and 48, and another manifold (not shown) spaced behind the rear panel 18 and below the upper manifolds 26 and 42 thereon, are arranged parallel to the circulating fluid manifolds previously described. Tap water is circulated into this system through an inlet tube 50 and is discharged through an outlet tube 52. Short projecting tubes 54 are provided along the surfaces of these manifolds to provide means for connection by flexible tubes 56 to short projecting tubes 58 from other portions of the thermocouples 14. The tap water is circulated by means of these manifolds and tubes to carry away the heat rejected at the hot junctions of these thermocouples.

A freezing section 60 is shown above the cooling compartment 10. The freezing compartment is formed by a cylindrical array of heat conductive elements 62. These elements cooperate to form a cylindrical freezing chamber 64. The construction of the freezing compartment is later more fully described in conjunction with the description of Figs. 2, 3 and 4. The thermocouples 66 are formed with elements 62 making up the cold junctions. The hot junctions are provided at cylindrical blocks 68. These blocks are connected to a circular inlet manifold 70, which provides a flow of circulating fluid which has absorbed a quantity of heat within compartment 10. This circulating fluid is still cool and able to absorb a quantity of heat from the hot junction blocks 68. The cold junctions are thereby enabled to absorb heat at a temperature low enough to freeze water within the compartment. The circulating water is channeled from inlet manifold 70 through short tubes 72 projecting from the circular manifold through a vertical row of hot junction blocks and then down to a projecting tube 74 on a circular-shaped outlet manifold 76.

This illustrative unit has no pump for circulating the heat transfer fluid in its cycle. In another form of this invention, however, a pump may be provided for circulating this fluid. Use of a heat exchanger or heat trap 80 eliminates the necessity of a pump and, therefore, allows the unit to operate without the use of any mechanical moving parts. This heat trap 80 is disclosed and claimed in copending application, entitled Heat Transfer Circulating System, Serial No. 461,980, filed by this same inventor on October 13, 1954.

The heat trap is constructed of a length of heat insulating tubing 82. It is coiled to permit a considerable length of tubing to be used without occupying a prohibitive amount of space. The circulating fluid from the freezing compartment discharge manifold 76 is channeled through a tube 84 which may be, for example, copper tubing. This tube is run through the center of a plug 86 of insulating material, for example rubber, sealing the end of the insulating tube 80. The heat conductive tube 84 is run through the center of the insulating tubing. The sizes of the tubing are arranged so that a flow of fluid may be run through the annular space between the tubes as well as through the inner tube. Another insulating plug 86 is provided at the other end of the insulating tubing 82 to seal the inner tube 84 as it emerges from the larger tube 82.

Couplings 88 and 90 are provided at opposite ends of the outer insulating tube for connection to an inlet tube 92 and outlet tube 94 respectively. The heat transfer fluid may be supplied to inlet tube 92 from an external pressure source, for example, tap water. This tap water flows through the annular space between the tubes. The temperature of the inflowing fluid is equalized with the temperature of the outflowing fluid by mutual heat exchange. On leaving the heat exchanger 80 the heat transfer fluid flows through the circulating fluid manifolds to be cooled by the cold junctions of the thermocouples 14. The heat exchanger 80 prevents heat from being carried directly into the system by the inflowing circulating fluid.

The coaxial tubes are made sufficiently long so that the temperature of the inlet fluid equalizes with the temperature of the outlet fluid before the inlet fluid leaves the heat exchanger. If the discharge circulating fluid flowing through the heat exchanger is at a temperature lower than the temperature of the inlet fluid it cools the inlet fluid substantially to the discharge fluid temperature before the inlet fluid flows into the system.

The discharge fluid before leaving the unit may be circulated through discharge tube 84 and a cooling coil 96. The cooling coil 96 is mounted in heat exchange relationship with a panel indicated by lines drawn with long and short dashes. This panel divides the refrigerating compartment from a rectifier 100. This rectifier may be connected through an electric cord 102 and pronged plug 104 to a source of alternating current electricity, for example 110 volts A. C. If direct current is available, the rectifier is not necessary. The direct current whether provided from a direct current source or from the rectifier is connected to the thermocouples. The thermocouples may be connected in series to provide equal current flow throughout. The heat exchange and electrical systems are later described in detail in conjunction with the description of schematic diagram Fig. 6.

Figures 2, 3, 4:
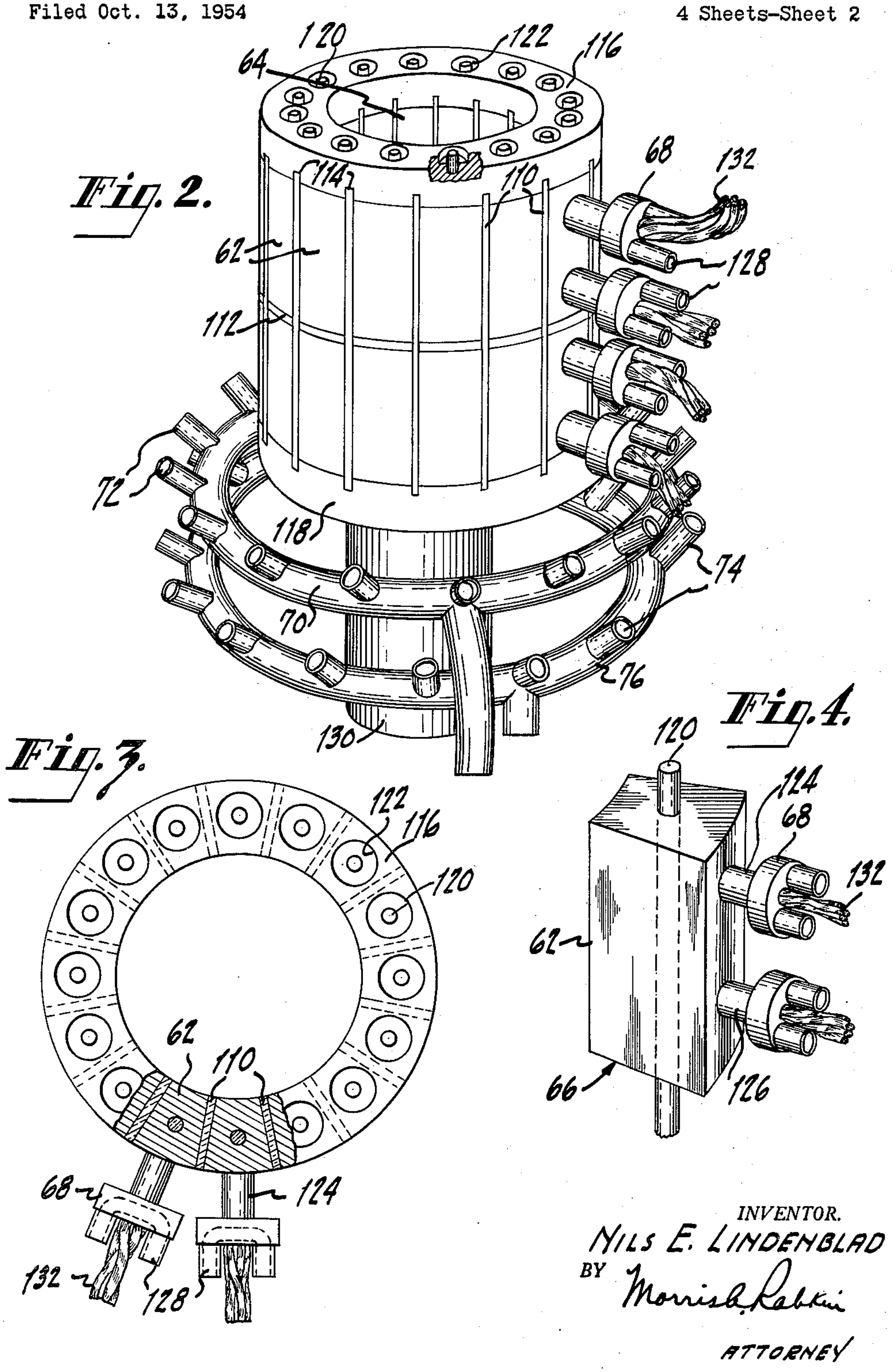
Fig. 2 is a perspective view of the freezing portion of this embodiment.
Fig. 3 is a top view, partially in section, of the portion shown in Fig. 2.
Fig. 4 is a perspective view of an element of the freezing portion shown in Fig. 2.

In Figs. 2, 3 and 4 enlarged views of the freezing unit clearly show features of its construction. The elements 62 are disposed in two annular layers which enclose a cylindrical compartment 64. The elements 62 are separated from each other by vertical strips 110 of insulating material. These strips 110 of insulating material may, for example, be made of Bakelite or Micarta. Horizontal strips 112 of insulating material are interspersed between the elements 62 in the upper and lower layers. The vertical strips 110 are inserted in notches 114 provided in faces of upper and lower rings 116 and 118. These rings provide a binding structure for holding elements 62 in the annular arrangement. Rings 116 and 118 are made of insulating material, for example Micarta. Rods 120 also of insulating material extend vertically through holes which pass through the retaining members 116 and 118, elements 62 and the interspersed strip of insulating material 112. These rods 120 hold the assembly together. Counterbored holes 122 are provided in the upper retaining member 116 concentric with the holes for the rods 120 to provide a means for grasping the upper portion of the rod for its withdrawal. A vertical row of elements may thereby be disassembled. A disassembled element 62 with its retaining rod 120 inserted within is shown in Fig. 4. Fig. 4 shows how this element 62 of heat conducting material, for example copper, is mounted to form the cold junction between two rods 124 and 126 of material having dissimilar thermoelectric properties to form a cold junction therebetween. Rod 124 may, for example, be made of bismuth and rod 126 may, for example, be made of antimony. Other alloys such as lead telluride and antimony telluride may also be used. Other materials may be used to form these rods. The cooling capacity of the thermocouple depends upon which materials are used. The hot junction ends of the rods are embedded in disc-shaped blocks 68. These blocks include a cavity whose ends are connected to the holes extending through tubes 128 which protrude from the surface of blocks 68. Lengths of tubing (not shown) connect these tubes to provide a flow of circulating fluid from an outlet of circular manifold 70 through a vertical row of four blocks 68 and then to an inlet tube 74 on the circular outlet manifold 76. These manifolds 70 and 76 may be made of a tubing material, for example, brass or copper. The freezing unit is mounted on a pedestal 130 of electricity and heat insulating material, for example Micarta. This pedestal may be mounted on a structural member within a cabinet (not shown) that may enclose the unit.

Electric current conducting cables 132 may be embedded in the hot junction disks 68. These cables 132 provide a means for passing a direct current through these rods in a direction to have elements 62 become cold junctions. As cool circulating water from the cooling compartment is circulated through the hot junction blocks 68, the thermocouples 66 are each capable of providing a temperature drop below the freezing point of water. The cooler the temperature of the circulating fluid, the lower the temperature within the compartment will be. Each element 62 cooperates with the adjacent element to provide a heat absorbing cylinder. This cylinder absorbs heat from all of the exposed surfaces of material placed within the compartment 64. It is, therefore, possible to freeze water placed within the compartment in a comparatively short time. This compartment therefore corresponds to the freezing compartment in the ordinary household refrigerator.

Figure 5:
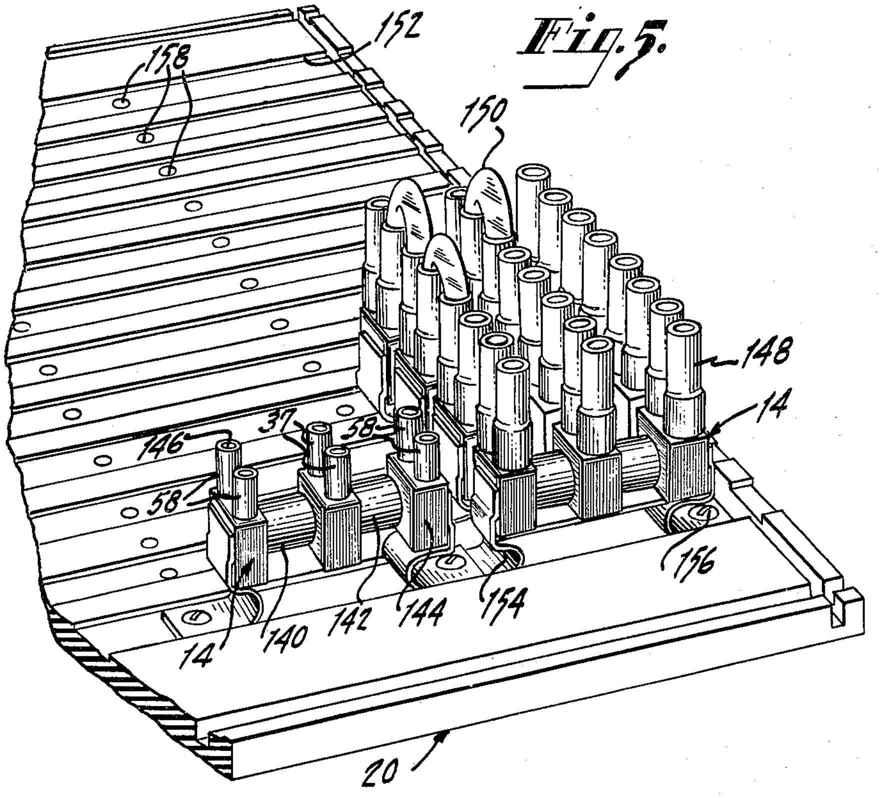
Fig. 5 is a perspective view of a portion of an array of thermocouples in partially assembled form.

In Fig. 5, one of the panels shown in Fig. 1, for example, panel 20, is shown with some of the array of thermocouples 14 mounted thereon in various stages of assembly. The panel 20 is made of electrical insulating material. It may, for example, be made of Bakelite or Micarta. Each of the thermocouples 14 mounted thereon is made up of two rods 140 and 142 of materials having dissimilar thermoelectric properties. These rods are disposed end to end and held between three blocks 144 of heat and electrical current conducting material. These blocks may be made of copper, for example. Rods 140 and 142 may be made, for example, of bismuth and antimony. Each of the blocks 144 has a U-shaped cavity for circulating a heat transfer fluid in heat exchange relationship therewith. The legs of the U-shaped cavity communicate with holes 146 in tubes 58 and 37 which extend from the sides of these blocks. Several of these thermocouples 14 are shown with rubber tubes 148 installed over these tubes 58 and 37. Elbows 150 of insulating material, for example, glass are shown slipped into the ends of some of these rubber tubes. These elbows provide a means for channeling the circulating fluid from one block to an adjacent block.

The panel 20 has a number of parallel grooves 152 milled across its face into the face of the panel. These grooves provide a channel for mounting a row of thermocouples across the panel. The thermocouples are mounted in horizontal and vertical rows on the panels. This arrangement may, therefore, be termed a grid like array. The electrical and fluid connections may be thereby systematically and conveniently assembled. The thermocouples are mounted within these grooves by means of flexible strips 154. These strips are made of electrically conductive material and, for example, may be made of copper. The strips are secured to the panel by screws 156 screwed into holes 158 spaced at intervals across the panel grooves 152. The terminal strips 154 provide a means for passing a direct current through these thermocouples and also provide a flexible means for mounting the thermocouples. The flexibility in mounting prevents injury to the rods 140 and 142 which may be fragile.

Figure 6:
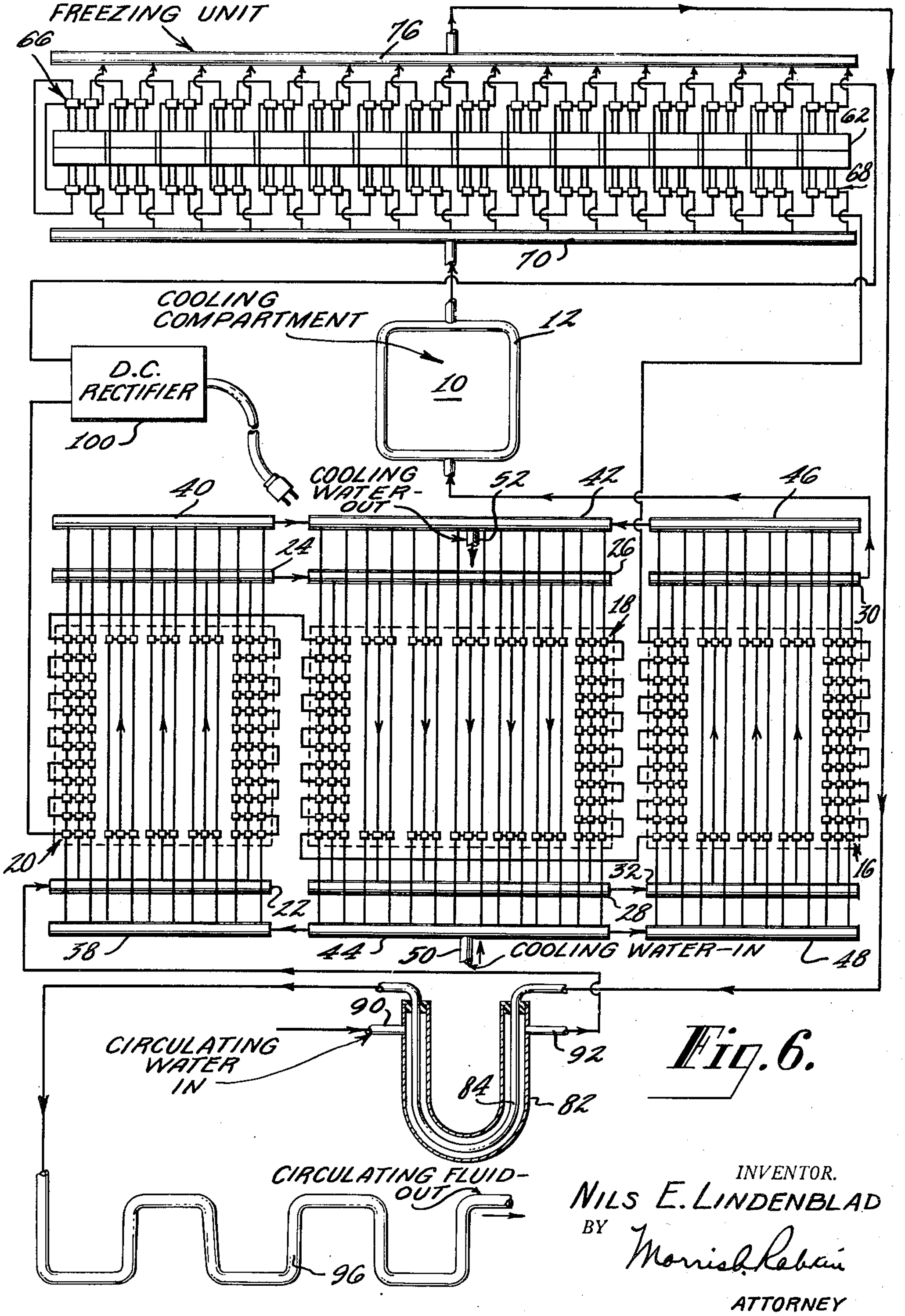
Fig. 6 is a schematic diagram of the functional elements and systems of this embodiment.

In Fig. 6 a schematic diagram shows how each portion of the unit is connected as a constituent part of the various systems which make up this thermoelectric refrigerating apparatus. Starting with the circulating fluid system, the circulating fluid, for example, tap water, flows into inlet tube 90 to the annular space provided between coaxial tubes 82 and 84 of heat exchanger 80. The inlet circulating water passes in heat exchange relationship with the circulating fluid flowing within the inner tube 84 which is being discharged from the system. As tht inlet circulating fluid flows from the heat exchanger 80 and through tube 92 it has become equalized in temperature with the fluid which is being discharged from the system. This water, which is now substantially equal in temperature to the circulating fluid discharged from the system, flows in the direction of the arrows to manifold 22. From manifold 22 it flows through the center blocks in the groups of three blocks indicated as horizontally disposed in the drawing of the vertical rows of thermocouples mounted on panel 20. The panels 16, 18 and 20 are schematically shown with only the peripheral row of thermocouples indicated on each panel. It is intended that the other thermocouples to make up the complete grid formation are included on each panel. The circulating fluid is channeled through these rows of central blocks in the indicated direction by tubing and elbows as previously described. Direct current is passed through these thermocouples, as is later described, in a direction to cause these center blocks to become cold junctions. These cold junctions absorb heat from the circulating fluid so that the fluid is successively or cumulatively cooled as it passes through a vertical row of these blocks. Manifold 22 runs parallel to the lower side of panel 20 so that circulating fluid runs through the center block of each row of thermocouples. Panel 20, for example, has mounted upon it 60 thermocouples arranged in five vertical rows. Each circulating fluid channel, therefore, successively passes through 12 cold junctions on its way to manifold 24 which is disposed parallel to the opposite side of panel 20. The vertical rows of cold junctions are each of the same length so that a substantially equal quantity of fluid runs through each of the vertical lines. The partially cooled circulating fluid then passes to the manifold 26 where it flows down through the vertical rows of cold junctions provided by the thermocouples on panel 18. Panel 18, for example, may include 84 thermocouples arranged in seven vertical rows each including 12 thermocouples. The panel 18, therefore, has a greater cooling capacity than panel 20. After circulating water flows in heat exchange relationship with the cold junctions on panel 18, the circulating water becomes even cooler as heat is absorbed therefrom. From manifold 28 at the opposite side or below panel 18, the circulating fluid flows to manifold 32 which is arranged parallel to the lower side of the last panel 16. Panel 16 is similar to panel 20 and has 60 thermocouples mounted in five vertical rows thereon. The circulating fluid flows up through the cold junctions of these thermocouples through five equal paths and is collected in manifold 30. By the time that the circulating fluid has passed in heat exchange relationship with all of the thermocouples, it has become fully cooled. The array of thermocouples, however, produces a temperature drop only equal to the temperature drop of any one thermocouple. The use of an array of units permits the full temperature drop to be developed in a quantity of water flow which is great enough to be used for practical cooling purposes. With lead telluride and antimony telluride in the two hundred and four thermocouples a temperature drop of approximately 27° C. in one quart of water per minute is provided.

The heat rejected from the hot junctions of the thermocouples is carried away by a cooling fluid circulated in heat exchange relationship with the hot junctions. As previously described, the hot junctions are formed within the blocks 144 which are disposed at the outer ends of each of thermocouples 14. The cooling fluid is circulated through vertical rows of these blocks by tubing and elbow connections as previously described. Manifolds 38, 40, 42, 44, 46 and 48 are provided parallel to opposite sides of the panels in a manner similar, but not identical, to the circulating fluid manifolds. Vertical conduits of cooling fluid are run through vertical rows of hot junctions from manifolds on one side or below the panels to manifolds above the panels. The cooling fluid which, for example, may be tap water is run in one direction through these vertical rows. It is not necessary, but it is preferable, to run the cooling fluid through only one row of hot junctions before it is discharged from the system. This provides a fresh supply of cooling water for each row of hot junctions. The cooler the water flowing through the hot junctions, the greater will be the temperature drop provided by the thermocouples. The cooling water is, therefore, led into the lower row of manifolds through an inlet 50 which is centrally disposed. The fluid, therefore, divides to flow in two directions. Substantially equal pressures are, therefore, provided through the manifold as a whole. This provides a substantially equal flow of cooling fluid through all of the vertical rows of hot junctions. Substantially equal temperature drops are thereby provided by each of the thermocouples.

After the cooled circulating fluid has been cooled to the full temperature drop provided by the array of thermocouples, it leaves manifold 30 and passes to the hollow walls 12 of cooling compartment 10. The cool fluid which is above the freezing temperature of water absorbs heat from substances placed within the cooling compartment. The cooling compartment, therefore, corresponds to the main storage portion of the ordinary household refrigerator. Food substances such as milk, butter, and cheese may be stored therein. The circulating fluid is still partialy cool after leaving the cooling compartment. It has absorbed heat from the substances within the compartment but not enough heat to warm the circulating fluid to the temperature of the tap water.

The circulating water then flows into the manifold 70. It is shown in Fig. 6, in a fully developed form so that the flow paths may be shown in full detail. The cooling water flows vertically through the hot junctions 68. Elements 62 are shown displaced from their actual physical position to more clearly show the direction of flow of the circulating fluid and the electrical circuit.

The circulating fluid is channeled through the inlet ring-shaped manifold 70 to the outlet ring-shaped manifold 76 through a number of vertical paths. Each vertical fluid channel passes through the two hot junctions 68 of a thermocouple 66 in the lower layer of the annular array. It then passes through the hot junctions of the thermocouple 66 arranged vertically above it in the upper layer of the array. From the upper thermocouple it flows into the outlet ring-shaped manifold 76 where it starts upon its discharge path from the system.

Since the circulating water flowing through these hot junctions is at a temperature which is sufficiently low to produce a temperature drop in each thermocouple below the freezing point of water, a material of a substance in heat exchange relationship with cold junction 62 freezes. Cooling compartment 64 is, therefore, equivalent to the ice cube or freezing compartment of the ordinary household refrigerator.

The circulating fluid discharged from the manifold 76 flows through the inner tube 84 of heat exchanger 80 where it absorbs heat from the inflowing circulating fluid. The inflowing fluid thereby equalizes in temperature with the outflowing fluid.

As previously described, this heat exchanger or heat trap 80 may be replaced by a circulating pump to recirculate the circulating fluid back through the array of thermocouples. The illustrative embodiment describes a refrigerating unit that has no moving parts. The heat trap is, therefore, included as a part of the circulating system.

As the outflowing circulating fluid flows out of the heat exchanger, it is channeled through a cooling coil 96. This cooling coil is made of heat conducting material, for example copper, and is mounted in heat exchange relationship with a baffle or partition. This partition separates the refrigerating apparatus from a rectifier 100 which may be mounted adjacent thereto. This rectifier is necessary where a direct current supply for the thermocouples is not available. Coil 96 absorbs any heat that may be released from the rectifier and discharges it with the outlet circulating fluid. This prevents any heat from being transmitted to the refrigerating unit. The rectifier provides a D. C. supply which may be, for example, 30 amps. at 110 bolts. The direct current is led horizontally through each horizontal row of thermocouples in a direction to make the center block of each thermocouple a cold junction. Each thermocouple in the system is thereby connected in series so that they draw equal currents. Each thermocouple, therefore, provides a substantially equal temperature drop. Each horizontal row of electrically connected thermocouples connects to the row above and the connections are made continuous from panel to panel and from the final panel 16 to a hot junction block 68 on one of the thermocouples in the freezing unit. The connection is run through all of the lower hot junctions so that each of the thermocouples in the lower row is connected in series and then through the upper row of hot junctions to connect each of the upper thermocouples in series. The same current, therefore, flows through every thermocouple in the unit to provide substantially uniform temperature drops across each thermocouple in the system.

The apparatus, as described, provides a thermoelectric refrigerator unit which utilizes the Peltier effect to cool substances and to freeze water into ice. A heat trap for the circulating fluid has been provided which enables this unit to operate with no internal mechanical moving parts.

What is claimed is:

1. A thermoelectric refrigerator comprising an array of thermocouples providing hot junctions and cold junctions, means for circulating a heat transfer fluid in heat exchange relationship with said hot junctions to carry away the heat rejected at said hot junctions, means for circulating a heat transfer fluid in heat exchange relationship with said cold junctions to supply heat to be absorbed by said cold junctions thereby cooling said fluid, another array of thermocouples providing additional hot junctions and cold junctions, means for mounting said thermocouples of said other array with cold junctions disposed to define walls of an enclosure, and means for circulating the said cooled fluid in heat exchange relationship with the hot junctions of said other array of thermocouples to carry away heat rejected at said hot junctions.

2. A thermoelectric refrigerating device comprising a bank of thermocouples disposed in rows in planar grid formation, said thermocouples including rods of materials having dissimilar thermoelectric properties, bars of conductive material connecting said rods to form hot and cold junctions between said rods when an electric current is passed through said connected rods, said bars having cavities for circulation of a heat transfer fluid in heat exchange relationship with said bars, a conduit system connecting cavities in the hot junction forming bars to carry a fluid for removing heat rejected at said hot junctions, another conduit system connecting the cavities in the cold junction forming bars to carry another fluid to be cooled by said cold junctions, means for connecting said thermocouples in an electrical circuit and providing an electric field directed along the longitudinal axes of said rods, a rod of one of said thermocouples being connected to a dissimilar rod of the adjacent thermocouple, and said conduit systems being disposed to provide flow of said fluids in a direction substantially perpendicular to the direction of said electric field.

3. A thermoelectric refrigerator comprising rods of materials having dissimilar thermoelectric properties, junction means connecting said rods to provide an array of thermocouples, means for passing an electric current through said array to cause said junction means to absorb and reject heat, means for circulating a heat conducting fluid in heat exchange relationship with said heat rejecting junctions to carry away rejected heat, means for passing another heat conducting fluid successively in heat exchange relationship with said heat absorbing junctions to cool said fluid, a walled enclosure for storing substances therein, said walls including means for passing said cooled fluid in heat exchange relationship with said enclosure, a segregated array of thermocouples including hot and cold junctions, and means for circulating said cooled fluid from said walls in heat exchange relationship with the hot junctions of said segregated array of thermocouples for absorbing heat rejected thereby to permit the cold junctions of said segregated array to absorb heat at a relatively lower temperature.

4. A thermoelectric refrigerator comprising an array of thermocouples providing hot junctions and cold junctions when an electric current is passed therethrough, a walled enclosure for storing substances at a temperature above freezing, a portion of said thermocouples being disposed in a panel array, another portion of said array of thermocouples having its cold junctions disposed to form a compartment, means for passing a heat transfer fluid successively in heat exchange relationship with cold junctions of said thermocouples in said panel array to cool said fluid, means for circulating the cooled fluid in heat exchange relationship with the walls of said enclosure to cool substances placed therein, and a means for circulating said heat transfer fluid from said walled enclosure in heat exchange relationship with the hot junctions of said thermocouples whose cold junctions form said compartment to produce a temperature drop in said compartment to below freezing.

5. In a thermoelectric refrigerator utilizing an array of thermocouples including hot junctions and cold junctions, a refrigerant circulating system comprising means for circulating a heat transfer fluid in successive heat exchange relationship with the cold junctions of a portion of said array of thermocouples to cool said fluid, a walled enclosure for storing substances therein above freezing, means for circulating the cool fluid in heat exchange relationship with the walls of said enclosure, means for circulating said heat transfer fluid from said enclosure walls in heat exchange relationship with the hot junctions of another portion of said thermocouples to provide a temperature at the cold junctions of said other portion of said thermocouples below freezing, means for supplying heat transfer fluid at a pressure to said circulating means, and means for counterflowing said heat transfer fluid from said hot junctions of said other array of thermocouples in heat exchange relationship with heat transfer fluid being supplied to said system to provide a flow of fluid to said system substantially equal in temperature to fluid being discharged from said system.

6. In a thermoelectric refrigerator, a freezing compartment comprising segments of heat and electrically conductive material, said segments having a form to provide a cylindrical compartment when assembled in an annular array, strips of insulating material disposed between adjacent segments of said compartment, rods of materials having dissimilar thermoelectric properties having one end thereof attached to said segments, means for passing an electric current through said rods and segments in a direction to cause said segments to absorb heat and the unattached ends of said rods to reject heat, and means for passing a cool fluid in heat exchange relationship with said unattached ends of said rods to carry away heat rejected therefrom.

References Cited in the file of this patent

UNITED STATES PATENTS

| | | |
|---|---|---|
| 413,136 | Dewey | Oct. 15, 1889 |
| 420,641 | Dewey | Feb. 4, 1890 |
| 773,838 | Wightman | Nov. 1, 1904 |
| 1,120,781 | Atenkirch et al. | Dec. 15, 1914 |
| 1,506,962 | Andrews | Sept. 2, 1924 |